3,839,371
CATALYTIC METHOD FOR THE PREPARATION OF OMEGA-NITROESTERS
Richard F. Love, Fishkill, N.Y., assignor to
Texaco Inc., New York, N.Y.
No Drawing. Filed Dec. 8, 1971, Ser. No. 206,196
Int. Cl. C07c 79/40
U.S. Cl. 260—404                23 Claims

ABSTRACT OF THE DISCLOSURE

A method for preparing omega-nitroesters by catalytically cleaving and reacting a cyclic alpha-nitroketone with an alcohol in a non-aqueous evironment at a temperature of from about 20° C. to about 120° C. The esters so prepared are useful as lubricant and fuel additives and as intermediates for the production of amino acids.

BACKGROUND OF THE INVENTION

This invention relates to a novel method of preparing nitroesters for cyclic nitroketones. In particular, it relates to a catalytic method for preparing nitroesters from cyclic nitroketones wherein a single molecule is produced containing both a nitro and ester function.

Heretofore, cleavage of cyclic nitroketones could be undertaken employing various nucleophiles. For example, alphanitrocyclohexanone can be cleaved employing sodium hydroxide to give sodium omega-nitrohexanoate. In a second stage, the organic acid is liberated by acidification with a mineral acid. Esterification of the liberated acid with an alcohol can in a further stage be accomplished by heating the reactants in the presence of a catalyst such as a mineral acid. In the reaction outlined above there is consumed at least one mole of base and one mole of acid. In addition a salt by-product is formed requiring disposal. Such a process involving a plurality of stages results in serious disadvantages in terms of economics and ultimately in the commercial attractiveness of the process.

It is therefore an object of this invention to provide a direct method for the preparation of omega-nitroesters.

It is another object of this invention to provide a method for the preparation of omega-nitroesters from cyclic alpha-nitroketones by a one step cleavage and esterification reaction.

A further object of this invention is to provide a method for preparing omega-nitroesters in high yields.

Other objects and advantages will become apparent from a reading of the following detailed description and examples.

SUMMARY OF THE INVENTION

Broadly, this invention contemplates a method for the preparation of omega-nitroesters which comprises catalytically cleaving and reacting a cyclic alpha-nitroketone with an alcohol at a temperature of from about 20° C. to about 120° C. in a non-aqueous environment in the presence of a basic catalyst. The instant method produces one mole of an omega-nitroester from the reaction between 1 mole of cyclic alpha-nitroketone and 1 mole of alcohol.

According to our invention the cyclic alpha-nitroketones catalytically cleaved and esterified herein correspond to the formula:

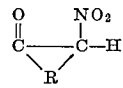

where R is a polymethylene radical of from 1 to 22 carbons or a substituted polymethylene radical of 2 to 22 carbons containing one or more substituents selected from the group consisting of alkyl or aryl. Illustrative of the cyclic alpha-nitroketones contemplated herein can be mentioned 2-nitrocyclopentanone, 2-nitrocyclohexanone, 2-nitrocycloheptanone, 2-nitro - 3 - methylcyclopentanone, 2-nitro-4-methylcyclohexanone, 2-nitro-4-phenylcyclohexane, 2-nitrocyclooctaneone, 2-nitrocyclodecanone, 2-nitrocyclododecanone, 2 - nitro-4-pentylcyclotetradecanone, 2-nitrocyclooctadecanone, 2-nitrocycloeicosanone and 2-nitrocyclodocosanone. The cyclic alpha-nitroketones employed as starting material herein may be prepared in the manner described in U.S. Pat. 3,466,326.

Alcohols contemplated in the instant process correspond to the formula R′OH and include primary and secondary alcohols. Tertiary alcohols have not been found to be reactive in the instant catalytic method. Thus, in the formula above R′ can be an alkyl group of from 1 to 20 carbon atoms such as methyl, ethyl, propyl, butyl, hexyl, octyl, decyl, dodecyl or hexadecyl. Dihydroxy and polyhydroxy primary and secondary alcohols are also intended to be understood as operative in the instant process. Illustrative of the alcohols operative in the instant method I mention methanol, ethanol, isopropanol, n-butanol, 2-hexanol, cyclohexanol, 2-octanol, 2-decanol, 1-dodecanol, 1-hexadecanol, ethylene glycol, propylene glycol and pentaerythritol. Mixtures of alcohols such as $C_{10}$ and $C_{13}$ alcohols are contemplated including isomeric mixtures containing primary and secondary alcohols. At least one mole and up to 100 moles of alcohol per mole of cyclic alpha-nitroketone are employed and preferably from 5 to 25 moles of alcohol per mole of nitroketone are present during the course of the reaction. Most importantly the reaction must be conducted in a non-aqueous environment, that is, in the substantial absence of water. The catalytic cleavage and reaction is sensitive to water and water in amounts exceeding 0.1 weight percent based on the weight of alcohol cause competing reactions to occur leading to the formation of acids instead of the desired esters. In a highly preferred embodiment absolute alcohols are used. Excessive amounts of alcohol can be employed serving as solvent for the reaction or alternatively an inert reaction solvent may be employed such as n-hexane, n-heptane, xylene, ethylbenzene, dichlorobenzene, methylnaphthalene, dioxane and tertiary alcohols.

The simultaneous cleavage and esterification of the present method is conducted catalytically, that is, in the presence of a catalytic agent at a temperature of from about 20 to 120° C., preferably from about 60 to 100° C. In practice, reactions below 20° C. are excessively slow and temperatures exceeding 120° C. are deleterious in that side reactions occur leading to decomposition of the nitroketone and formation of products other than the nitroester. Pressures of from 0 to 40 p.s.i.g. may be employed. In general, if the alcohol employed has a boiling point above the selected operating temperature, atmospheric pressure will suffice. When the alcohol possesses a boiling point below that of the selected temperature, the reaction can be conducted at autogenous pressure.

More specifically the process of this invention comprises contacting a cyclic alpha-nitroketone with an alcohol in the presence of a basic catalyst. Illustrative of the basic catalysts contemplated are oxides, hydroxides and salts of the metals of Groups IA and IIA of the Periodic Table exemplified by sodium hydroxide, sodium carbonate, sodium fluoride, sodium acetate, sodium decanoate, potassium hydroxide, potassium carbonate, potassium fluoride, potassium acetate, potassium octanoate, calcium oxide, calcium carbonate, calcium fluoride, calcium propionate, barium oxide, barium carbonate, barium fluoride and barium hexanoate. Other basic catalysts include tertiary amines such as trimethylamine and triethylamine.

Highly preferred catalysts are sodium carbonate, potassium carbonate, sodium fluoride, potassium fluoride, calcium fluoride, barium fluoride and the sodium or potassium salts of weakly acidic ion exchange resins. The weakly acidic ion exchange resins represent known materials and can be prepared by cross-linking an unsaturated carboxylic acid, such as acrylic acid, methacrylic acid or maleic acid, with a cross-linking agent such as divinylbenzene or ethylene dimethacrylate or by condensation of resorcylic acid and formaldehyde. In general an ester of the acid is used in the suspension polymerization process and is subsequently hydrolyzed. Highly preferred catalysts in the instant invention are the alkali metal salts, particularly the sodium salt, of a weakly acidic ion exchange resin sold under the trade name "Amberlite IRC-50" by Rohm and Haas Company.

In accordance with the present invention cyclic alpha-nitroketones are contacted with the catalyst in a weight ratio of catalyst to nitroketone between about 0.01:1 and 0.2:1 under non-aqueous conditions.

The omega-nitroesters prepared according to this invention correspond to the formula:

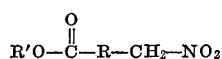

where R and R' are as heretofore defined. Specific examples of esters prepared by instant catalytic method include by way of example methyl 5-nitropentanoate, ethyl 6-nitrohexanoate, isopropyl 7-nitroheptanoate, 2-hexyl 5-nitro-4-methylpentanoate, n-butyl 6-nitro-4-phenylhexanoate, methyl 8-nitrooctanoate, 2-octyl 10-nitrodecanoate, ethyl 12-nitrododecanoate, n-propyl 18-nitrooctadecanoate and methyl 22-nitrodocosanoate. Such esters are useful as nematocides, lubricant and fuel additives. Further they can be utilized as intermediates in the preparation of amino acids and polyamides.

At the completion of the catalytic cleavage and esterification reaction, the product obtained comprises a mixture of omega-nitroester, catalyst, alcohol and solvent if employed. To recover the nitroester, the reaction mixture can be initially filtered to remove insoluble catalyst. Where a catalyst bed or column is used filtration may be unnecessary. To separate excess alcohol and solvent, the mixture can be distilled at atmospheric pressure or vacuum evaporation may be employed. Very high purities of nitroester can be obtained by vacuum distillation.

In order to more fully illustrate the nature of this invention and the manner of practicing the same the following examples are presented. In the examples, each alcohol employed contained less than 0.1 weight percent water.

EXAMPLE I

A solution containing 2.8 grams (19.6 mmoles) of 2-nitrocyclohexanone, 50 milliliters (1.23 moles) of anhydrous methanol and 0.5 gram (4 milliequivalents) of the sodium salt of a weakly acidic ion exchange resin sold as "Amberlite IRC-50" was refluxed for 3 hours at 65° C. The solution was then filtered, 0.5 gram of catalyst recovered and the filtrate stripped of solvent at 30° C. under a pressure of 35 mm./Hg. A residual pale yellow oil weighing 3.3 grams (96 percent yield) was identified by infrared and nuclear magnetic resonance spectral analyses to be methyl 6-nitrohexanoate.

EXAMPLE II

A solution containing 2.3 grams (10 mmoles) of 2-nitrocyclododecanone, 0.3 gram (5.2 mmoles) of potassium fluoride and 40 milliliters (0.98 mole) of dry methanol was refluxed for 3 hours at 65° C. The solution was thereafter stripped of methanol at 30° C. under a pressure of 35 mm./Hg. The residue was taken up in 50 milliliters of benzene and filtered to recover the potassium fluoride catalyst (0.26 gram). The filtrate was stripped of benzene at 30° C. under 35 mm./Hg pressure and an amber colored oil weighing 2.3 grams (87 percent yield) was identified by infrared and nuclear magnetic resonance spectral analyses to be methyl 12-nitrododecanoate.

EXAMPLE III

In a manner similar to Example II, a solution of 3.5 grams (15.4 mmoles) of 2-nitrocyclododecanone in 50 milliliters (1.25 mole) of dry methanol containing 1.0 gram (8 milliequivalents) of the sodium salt of "Amberlite IRC-50" was refluxed for three hours at 65° C. The solution was then cooled and filtered, 1.1 gram of catalyst recovered, and the filtrate stripped at 30° C. under a pressure of 35 mm./Hg. There was recovered 3.38 grams (85 percent yield) of methyl 12-nitrododecanoate.

I claim:

1. A method for the preparation of omega-nitroesters which comprises catalytically cleaving and reacting a cyclic alpha-nitroketone corresponding to the formula:

where R is a polymethylene radical of from 1 to 22 carbons or a substituted polymethylene radical of 2 to 22 carbons containing one or more substituents selected from the group consisting of alkyl and aryl, with an alcohol at a temperature of from about 20° C. to 120° C. in a non-aqueous environment in the presence of a substantially insoluble catalyst selected from the group consisting of carbonates, fluorides, and salts of weakly acidic ion exchange resins of the metals sodium, potassium, calcium and barium.

2. A method according to Claim 1 wherein said alcohol is a primary or secondary alcohol corresponding to the formula R'OH, where R' is an alkyl group of from 1 to 20 carbon atoms.

3. A method according to Claim 1 wherein said temperature is from about 60° C. to 100° C.

4. A method according to Claim 1 wherein said cleaving and reacting is conducted at a pressure of from 0 to 40 p.s.i.g.

5. A method according to Claim 1 wherein said catalyst is the sodium salt of a weakly acidic ion exchange resin.

6. A method according to Claim 1 wherein said catalyst is potassium fluoride.

7. A method according to Claim 1 wherein said catalyst is sodium fluoride.

8. A method according to Claim 1 wherein said catalyst is calcium fluoride.

9. A method according to Claim 1 wherein said catalyst is sodium carbonate.

10. A method according to Claim 1 wherein said nitroketone is 2-nitrocyclohexanone.

11. A method according to Claim 1 wherein said nitroketone is 2-nitrocyclooctanone.

12. A method according to Claim 1 wherein said nitroketone is 2-nitrocyclodecanone.

13. A method according to Claim 1 wherein said nitroketone is 2-nitrocyclododecanone.

14. A method according to Claim 1 wherein said alcohol is methanol.

15. A method according to Claim 1 wherein said alcohol is ethanol.

16. A method according to Claim 1 wherein said alcohol is isopropanol.

17. A method according to Claim 1 wherein said alcohol is 2-octanol.

18. A method according to Claim 1 wherein said alcohol is ethylene glycol.

19. A method according to Claim 1 wherein said nitroester is methyl 6-nitrohexanoate.

20. A method according to Claim 1 wherein said nitroester is methyl 8-nitrooctanoate.

21. A method according to Claim 1 wherein said nitroester is 2-octyl 10-nitrodecanoate.

22. A method according to Claim 1 wherein said nitroester is methyl 12-nitrododecanoate.

23. A method according to Claim 1 wherein said nitroester is methyl 18-nitrooctadecanoate.

References Cited

UNITED STATES PATENTS 3,551,465   12/1970   Ellis _____ 260—410.9

OTHER REFERENCES

Matlack et al.: "Cleavage of 2-Nitrocyclohexanone by Base," J. Org. Chem., vol. 32, 1995–6 (1967).

LEWIS GOTTS, Primary Examiner

D. G. RIVERS, Assistant Examiner

U.S. Cl. X.R.

260—471 A, 478